United States Patent [19]
Azuma et al.

[11] Patent Number: 5,265,490
[45] Date of Patent: Nov. 30, 1993

[54] ORTHOGONAL TWO-AXIS MOVING APPARATUS

[75] Inventors: Yusaku Azuma; Hiroyuki Kigami, both of Yokohama; Yasuhiro Sawada, Chofu, all of Japan

[73] Assignee: Canon Kabushiki Kaisha, Tokyo, Japan

[21] Appl. No.: 853,433

[22] Filed: Mar. 18, 1992

[30] Foreign Application Priority Data

Mar. 20, 1991 [JP] Japan .................................. 3-57258

[51] Int. Cl.⁵ .................... G05G 11/00; B25J 11/00
[52] U.S. Cl. .................... 74/479 BF; 74/89.2; 901/16; 901/21
[58] Field of Search ............ 74/89.2, 89.21, 89.22, 74/479, 479 R, 479 B, 479 BF; 414/744.1; 901/16, 17, 21

[56] References Cited

U.S. PATENT DOCUMENTS

| | | | |
|---|---|---|---|
| 4,507,044 | 3/1985 | Hutchins et al. | 901/21 X |
| 4,524,520 | 6/1985 | Levy | 74/89.22 X |
| 4,655,442 | 4/1987 | Laukenmann et al. | 74/89.21 X |
| 5,063,334 | 11/1991 | Tanita et al. | 318/568.10 |

FOREIGN PATENT DOCUMENTS

| | | | |
|---|---|---|---|
| 310481 | 4/1989 | European Pat. Off. | 901/16 |
| 3926670 | 2/1991 | Fed. Rep. of Germany | 901/21 |
| 2590560 | 5/1987 | France | 901/21 |
| 3-55177 | 3/1991 | Japan . | |
| 1516342 | 10/1989 | U.S.S.R. | 901/21 |
| 2210350 | 6/1989 | United Kingdom | 901/21 |

*Primary Examiner*—Leslie A. Braun
*Assistant Examiner*—David W. Laub
*Attorney, Agent, or Firm*—Fitzpatrick, Cella, Harper & Scinto

[57] ABSTRACT

An orthogonal two-axis moving apparatus is provided with a first guide member extending along a vertical direction, a second guide member mounted on the first guide member for movement along the vertical direction and extending along a horizontal direction, and a slide block mounted on the second guide member for movement along the horizontal direction. A timing belt having its opposite ends fixed to the slide block is passed over first and second drive rollers rotatably mounted on the opposite ends of the first guide member and rotatively driven by first and second motors, four idle rollers rotatably supported on one end of the second guide member and two idle rollers rotatably supported on the other end of the second guide member, and a driven roller rotatably supported on the slide block.

5 Claims, 7 Drawing Sheets

ORTHOGONAL TWO-AXIS MOVING APPARATUS

BACKGROUND OF THE INVENTION

Field of the Invention

This invention relates, for example, to the structure of an arm of an industrial robot, and particularly to an orthogonal two-axis moving apparatus for moving two arms extending along two axes orthogonal to each other.

Related Background Art

An orthogonal two-axis moving apparatus for moving two arms extending two axes orthogonal to each other has heretofore been designed such as that described in Japanese Patent Application, No. 1-188913 filed on Jul. 24, 1989 by Applicant, wherein an entire horizontal arm having a hand mounted thereon is moved back and forth along a horizontal direction.

FIG. 9 of the accompanying drawings shows the construction of a prior-art orthogonal two-axis moving apparatus according to the above-mentioned prior application. Describing this prior-art construction the reference numeral 100 designates a pair of guide shafts extending along a vertical direction. Fixed blocks 102 and 101 are fixed to the upper and lower ends, respectively, of these guide shafts 100. A drive roller 105 rotatively driven by a motor 103 is mounted on the lower fixed block 101, and a drive roller 106 rotatively driven by a motor 104 is mounted on the upper fixed block 102. A slide block 107 is vertically movably guided on the guide shafts 100 through ball bushes 109a and 109b. A pair of slide shafts 108 extending along a direction orthogonal to the guide shafts 100 are mounted on the slide block 107 through ball bushes 110a and 110b for sliding along a horizontal direction.

Four idle rollers 111a, 111b, 111c and 111d are rotatably mounted on the slide block 107, and an idle roller 113 is rotatably mounted on a fixed block 112 mounted on one end of the slide shafts 108. On the other hand, a hand mounting portion 114 is fixed to the other end of the slide shafts 108. A connecting belt 115 having its opposite ends secured to the hand mounting portion 114 is passed over the drive rollers 105, 106 and the five idle rollers 111a, 111b, 111c, 111d and 113, as shown. Thus, by the rotation of the two motors 103 and 104, the hand mounting portion 114 is movable in a vertical direction and a horizontal direction.

FIG. 10 of the accompanying drawings shows the construction of a cylindrical robot making the use of the prior-art orthogonal two-axis moving apparatus shown in FIG. 9. The reference numeral 116 denotes a rotating mechanism connected to the fixed block 101 to rotatively drive the entire construction about a vertical axis. A hand 117 for clamping parts, not shown, and moving and assembling them is removably mounted on the hand mounting portion 114.

By the construction as shown in FIG. 9, it becomes possible to move the hand 117 to any position in the space.

In such a prior-art orthogonal two-axis moving apparatus, however, the slide shafts 108 prescribed as the arms having the horizontal hand mounted thereon are operated so as to be moved back and forth along a horizontal direction and thus, particularly one end portion on which the hand is not mounted protrudes greatly rearwardly with the operation of retracting the hand. This has led to the disadvantage that no article can be disposed rearwardly of the orthogonal two-axis moving mechanism in the area for grasping a part by the hand 117 or it will hamper the rearwardly protruding movement of the slide shafts 108. There has also been the disadvantage that these slide shafts 108 become a hindrance to bringing piping or the like to the fore end in order to supply air or the like to the hand 117.

SUMMARY OF THE INVENTION

The present invention has been made in view of the above-noted problems and a primary object thereof is to provide an orthogonal two-axis moving apparatus designed such that a hand does not protrude rearwardly with its movement in a horizontal direction.

Another object of the present invention is to provide an orthogonal two-axis moving apparatus which enables articles to be disposed on the side opposite to the working area.

In order to solve the above-noted problems and achieve the above objects, the orthogonal two-axis moving apparatus according to the present invention is characterized by comprising a first guide member extending along a first direction, a second guide member mounted on said first guide member for movement along said first direction and extending along a second direction orthogonal to said first direction, a slide member mounted on said second guide member for movement along said second direction, first and second drive rollers rotatably mounted on the opposite ends, respectively, of said first guide member, first and second motors for rotatively driving said first and second drive rollers, respectively, four idle rollers rotatably supported on one end of said second guide member, two idle rollers rotatably supported on the other end of said second guide member, a driven roller rotatably supported on said slide member, and a connecting belt having its opposite ends fixed to said slide member and passed over said six rotatable idle rollers, said driven roller and said first and second drive rollers.

The orthogonal two-axis moving apparatus according to the present invention is further characterized in that said first and second motors for rotatively driving said first and second drive rollers, respectively, are each provided with a brake mechanism.

The orthogonal two-axis moving mechanism according to the present invention is further characterized in that said brake mechanism is designed to release its braking force upon electrical energization thereof and exert its braking force upon electrical deenergization thereof.

The orthogonal two-axis moving apparatus according to the present invention is further characterized in that the driven roller rotatably supported on said slide member has mounted thereon a brake mechanism operable so as to restrain the rotation thereof.

The orthogonal two-axis moving apparatus according to the present invention is further characterized in that said first and second drive rollers, two of the four idle rollers disposed on one end of said second slide member and the two idle rollers disposed on the other end of said second slide member are each comprised of a toothed roller, said connecting belt is comprised of a timing belt having teeth formed on the inner side thereof, and the remaining idle rollers which are not toothed rollers and said driven roller are each comprised of a cylindrical roller having an outer peripheral surface for guiding the smooth outer side of the timing belt.

The orthogonal two-axis moving apparatus according to the present invention is further characterized in that said second guide member at one end thereof is mounted on said first guide member for movement along said first direction.

The orthogonal two-axis moving apparatus according to the present invention is further characterized in that said first direction of said first guide member is along a vertical direction.

The orthogonal two-axis moving apparatus according to the present invention is further characterized in that said first guide member is supported for rotation about the lengthwise axis thereof.

The orthogonal two-axis moving apparatus according to the present invention is further characterized in that both the first and second directions of said first and second guide members, respectively, are along a horizontal direction.

The orthogonal two-axis moving apparatus according to the present invention is further characterized in that said first guide member is vertically movably supported.

According to the orthogonal two-axis moving apparatus of the present invention constructed as described above, when the second guide member is to be moved or when the slide member is to be moved, a torque of the sum of the output of the two motors can be utilized and thus, a bulky item can be moved by a small motor. In calculation, when one and the same matter is to be moved at the same acceleration, use can be made of a motor of ½ output and thus, the adoption of a motor of such a low output can reduce the cost of the apparatus. Also, only the slide member on the second guide member is moved and thus, dead space may be small. Where the apparatus is used, for example, as a robot of orthogonal coordinates, it becomes possible to dispose an object on that side on which the second guide member does not protrude. Also, where the apparatus is used as a cylindrical robot, it will become possible even to dispose a thing immediately rearwardly of the first guide member if for example, the angle of a rotation is regulated to limit the operation area.

DESCRIPTION OF THE PREFERRED EMBODIMENTS

The construction of an embodiment of the orthogonal two-axis moving apparatus according to the present invention will hereinafter be described in detail with reference to FIGS. 1 to 8 of the accompanying drawings.

Figure 1:
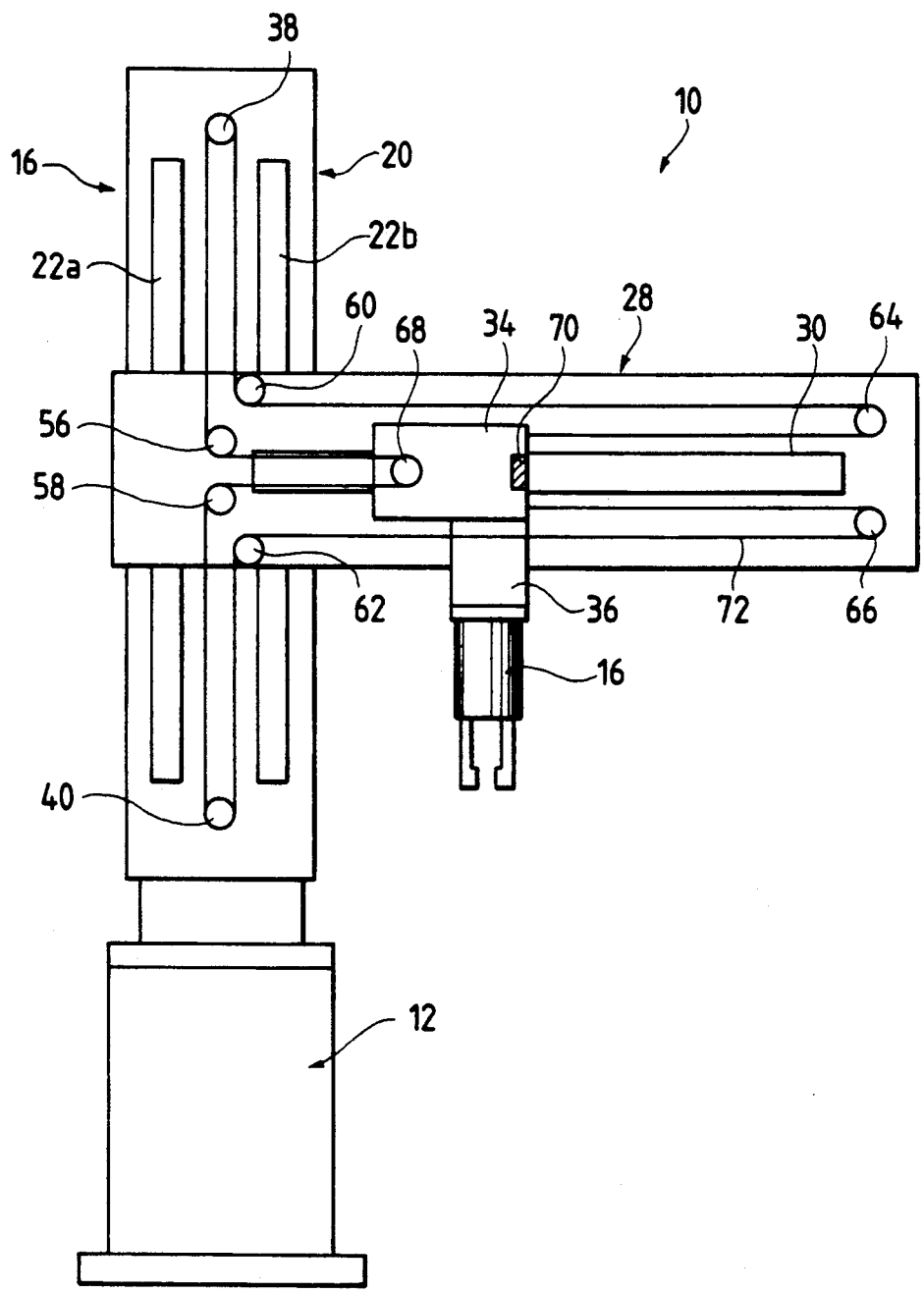
FIG. 1 is a front view showing the construction of a cylindrical robot to which the construction of an embodiment of the orthogonal two-axis moving apparatus according to the present invention is applied.

FIG. 1 shows the construction of an embodiment when the orthogonal two-axis moving apparatus of the present invention is applied to a cylindrical robot. This cylindrical robot 10 is provided with a rotatively driving portion 12 comprising a servomotor with an encoder, not shown, and reduction gears, an orthogonal two-axis moving apparatus 14 rotatively driven about a vertical axis by the rotatively driving portion 12, and a hand 16 supported for movement in a vertical direction and a horizontal direction by the orthogonal two-axis moving apparatus 14 and executing a predetermined clamping operation for a part, not shown. The rotatively driving portion 12 is designed to rotatively drive the entire two-axis moving apparatus 14 and be capable of being stopped at any position.

The construction of the orthogonal two-axis moving apparatus 14 which is the feature of the present invention will now be described with reference to FIGS. 1 and 2.

The orthogonal two-axis moving apparatus 14 of this embodiment is provided with a first guide member 20 directly connected to the rotatively driving portion 12 and rotatively driven about a vertical axis. The first guide member 20 is comprised of a substantially long plate-like member extending along a vertical direction as a first direction. A pair of guide rails 22a and 22b extending along the vertical direction and parallel to each other are mounted on the surface of the first guide member 20. A second guide member 28 is vertically movably supported on the guide rails 22a and 22b through pairs of upper and lower slide bearings 24a, 24b; 26a, 26b (the slide bearing 26b being not shown in FIGS. 1 and 2 for the sake of convenience). This second guide member 28 is comprised of a substantially long plate-like member extending along a horizontal direction as a second direction orthogonal to the above-mentioned first direction. The above-mentioned four slide bearings 24a, 24b; 26a, 26b are positioned at the left end of the second guide member 28 as viewed in FIG. 2 and mounted on the back thereof.

A slide rail 30 extending along the horizontal direction is mounted on the surface of the second guide member 28. A slide block 34 is supported on the slide rail 30 through a slide bearing 32 for sliding movement along the horizontal direction. The above-mentioned hand 16 is removably mounted on the slide block 34 through a mounting bracket 36. The slide rail 30 is designed to terminate within the range of extension of the second guide member 28. With such a construction, the hand 16 becomes movable to any position in three-dimensional space by a combination of three degrees of freedom in the vertical direction, the horizontal direction and about the rotational axis of the rotatively driving portion 12.

Figure 3:
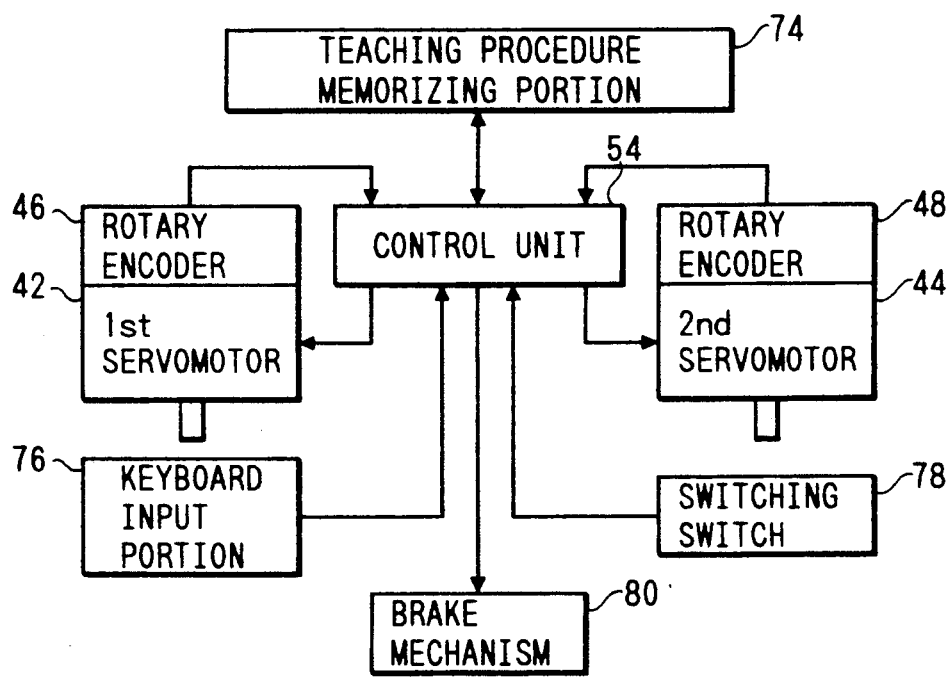
FIG. 3 is a block diagram schematically showing the construction of a control system in the cylindrical robot shown in FIG. 1.

First and second drive rollers 38 and 40 equal in diameter to each other are rotatably supported on the surfaces of the upper and lower ends of the first guide member 20. First and second servomotors 42 and 44 for rotatively driving the first and second drive rollers 38 and 40, respectively, are mounted on the backs of the upper and lower ends of the first guide member 20, and the output shafts, not shown, of the respective servomotors are connected to the first and second drive rollers 38 and 40. Rotary encoders 46 and 48 are connected to the output shafts, respectively, of the first and second servomotors 42 and 44 to detect the amounts of rotative driving of the drive rollers 38 and 40, respectively. These rotary encoders 46 and 48, as shown in FIG. 3, are connected to a control unit 54, and the control of the speeds and angles of rotation of the first and second servomotors 42 and 44 is executed by conventional feedback control.

On the other hand, first and second idle rollers 56 and 58 aligned with the first and second drive rollers 38 and 40 with respect to the vertical direction and vertically spaced apart from each other by a first distance d1, and third and fourth idle rollers 60 and 62 rightwardly spaced apart from the first and second idle rollers 56 and 58 by a second distance d2 and vertically spaced apart from the first idle roller 56 and the second idle roller 58, respectively, and vertically spaced apart from each other by a third distance d3 longer than the first distance d1 are rotatably supported on the surface of one end portion of the second guide member 28, i.e., the surface of that end portion on which the four slide bearings 24a, 24b; 26a, 26b are mounted. That is, a total of four idle rollers 56, 58, 60 and 62 are rotatably supported at one end portion of the second guide member 28.

Also, fifth and sixth idle rollers 64 and 66 vertically spaced apart from each other by a fourth distance d4 are rotatably supported on the surface of the other end portion of the second guide member 28. A driven roller 68 is rotatably supported on the surface of the aforementioned slide block 34. The height of the center position of this driven roller 68 is set so as to be the same as the height of the intermediate position between the first and second idle rollers 56 and 58.

In this embodiment, the first and second drive rollers 38 and 40, the first to sixth idle rollers 56, 58, 60, 62, 64 and 66 and the driven roller 68 are formed with the same diameter, but this is not restrictive. The above-mentioned first distance d1 is set to just the same length as the diameter of the driven roller 68. Also, the above-mentioned second distance d2 is set to just the same length as the diameter of the first or second drive roller 38 or 40. The above-mentioned third distance d3 is set to a distance enough for the lower end of the third idle roller 60 to be slightly upwardly spaced apart from the upper end edge of the slide block 34 and for the upper end of the fourth idle roller 62 to the slightly downwardly spaced apart from the lower end edge of the slide block 34. Further, the above-mentioned fourth distance d4 is set to a distance enough for the lower end of the fifth idle roller 64 to be slightly downwardly spaced apart from the upper end edge of the slide block 34 and for the upper end of the sixth idle roller 66 to be slightly upwardly spaced apart from the lower end edge of the slide block 34.

Figure 2:
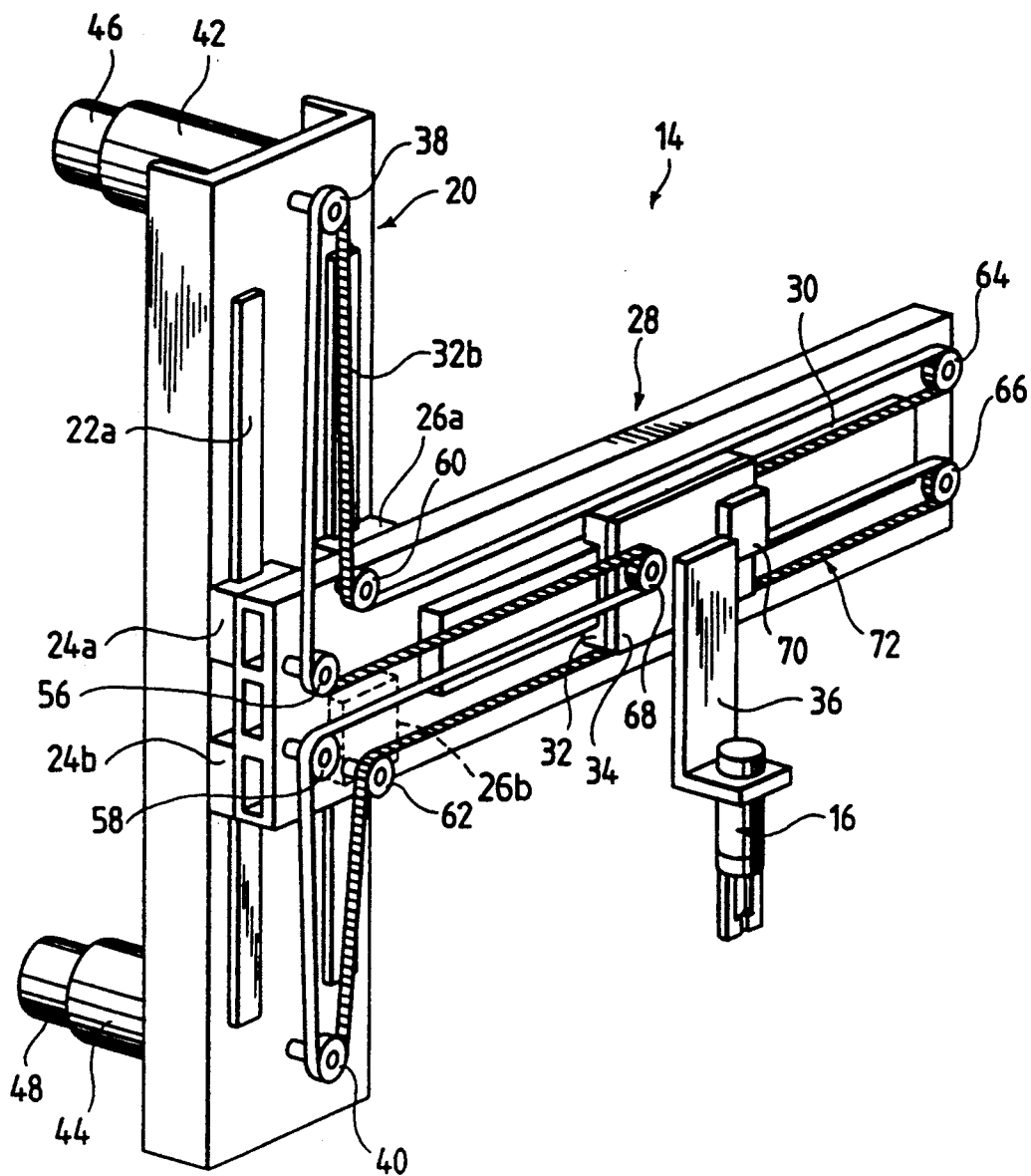
FIG. 2 is a perspective view showing the construction of an embodiment of the orthogonal two-axis moving apparatus as it is taken out.

Also, the first and second idle rollers 56 and 58 are positioned in such a manner that the outer peripheries thereof contact with the tangential line vertically extending at the left of the first and second drive rollers 38 and 40 as viewed in FIG. 2, and the third and fourth idle rollers 60 and 62 are positioned in such a manner that the outer peripheries thereof contact with a tangential line vertically extending at the right of the first and second drive rollers 38 and 40 as viewed in FIG. 2. Further, the fifth idle roller 64 is positioned in such a manner that the outer periphery thereof contacts with a tangential line horizontally extending below the third idle roller 60, and the sixth idle roller 66 is positioned in such a manner that the outer periphery thereof contacts with the tangential line horizontally extending above the fourth idle roller 62.

Furthermore, a timing belt fixing portion 70 having an upper end surface which provides a surface contacted by a tangential line horizontally extending below the fifth idle roller 64 and having a lower end surface which provides a surface contacted by the tangential line horizontally extending above the sixth idle roller 66 is secured to the surface of the slide block 34.

A timing belt 72 is passed over the drive rollers 38, 40, the first to sixth idle rollers 56, 58, 60, 62, 64, 66 and the driven roller 68 in a manner described below. This timing belt 72 has one end thereof fixed to the upper end surface of the fixing portion 70, is passed over the fifth idle roller 64 with its inner side engaged with the outer periphery of the fifth idle roller, is thereafter passed over the third idle roller 60 with its outer side engaged with the outer periphery of the third idle roller, is thereafter passed over the first drive roller 38 with its inner side engaged with the outer periphery of the first drive roller, is thereafter passed over the first idle roller 56 with its inner side engaged with the outer periphery of the first idle roller 56, is thereafter passed over the driven roller 68 with its outer side engaged with the outer periphery of the driven roller, is thereafter passed over the second idle roller 58 with its inner side engaged with the outer periphery of the second idle roller, is thereafter passed over the second drive roller 40 with its inner side engaged with the outer periphery of the second drive roller, is thereafter passed over the fourth idle roller 62 with its outer side engaged with the outer periphery of the fourth idle roller, is thereafter passed over the sixth idle roller 66 with its inner side engaged with the outer periphery of the sixth idle roller, and finally has its other end fixed to the lower end surface of the fixing portion 70.

This timing belt 72 has a number of teeth formed on the inner side thereof and has its outer side formed flat. Each of the first and second drive rollers 38 and 40, the first and second idle rollers 56 and 58 and the fifth and sixth idle rollers 64 and 66 which are engaged by the inner side of the timing belt 72 is comprised of a toothed roller having on its outer periphery teeth mesh-engaged with the teeth on the diming belt. Also, each of the third and fourth idle rollers 60 and 62 and the driven roller 68 which are engaged by the outer side of the timing belt 72 is comprised of a cylindrical roller having a smooth outer peripheral surface.

As shown in FIG. 3, the control unit 54 has connected thereto a teaching procedure memorizing portion 74 for memorizing the taught movement procedure of the hand 16, a keyboard input portion 76 for teaching the movement procedure of the hand 16 through a keyboard or the like, and an input mode switching switch 78 for switching a keyboard input mode for teaching the movement procedure of the hand 16 through an input portion 76 or a direct input mode for manually moving the hand 16 and directly inputting the movement procedure. That is, when the keyboard input mode is set by the switching switch 78, the movement procedure set through the keyboard input portion 76 is memorized in the teaching procedure memorizing portion 74, and when the direct input mode is set, the position of the hand 16 manually moved is directly memorized in the teaching procedure memorizing portion 74 with the output information from the first and second rotary encoders 46 and 48 being converted.

The moving operation of the hand 16 in the orthogonal two-axis moving apparatus 14 of the above-described construction will now be described with reference to FIGS. 4 to 7.

Figure 4:
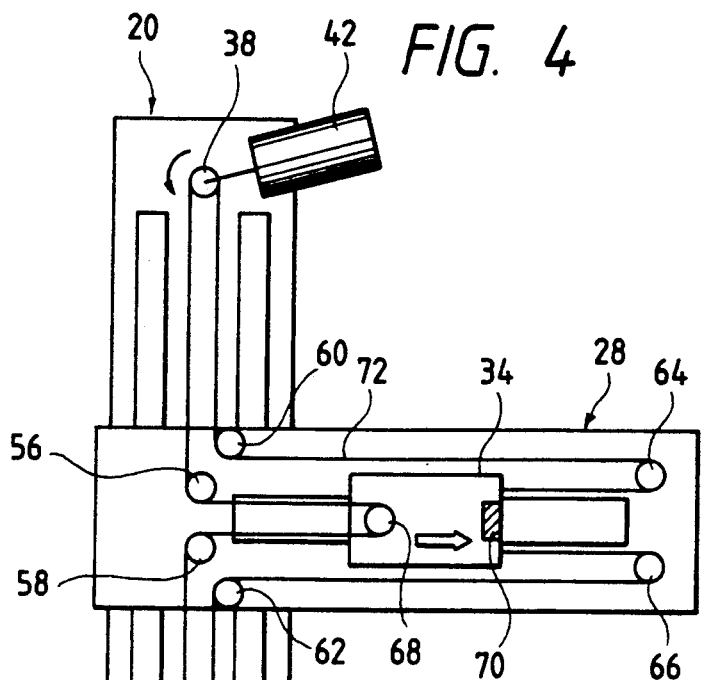
FIG. 4 is a front view showing a state in which only a slide block is moved to the right as viewed in this figure.

First, as shown in FIG. 4, the first drive roller 38 is rotated in the counter-clockwise direction by the first servomotor 42 and in synchronism therewith, the second drive roller 40 is rotated by the same amount in the clockwise direction by the second servomotor 44. As a result, that portion of the timing belt 72 which lies between the first idle roller 56 and the driven roller 68 and that portion of the timing belt 72 which lies between the second idle roller 58 and the driven roller 68 vary so as to lengthen their lengths by the same amount, and that portion of the timing belt 72 which lies between the fifth idle roller 64 and the fixing portion 70 and that portion of the timing belt 72 which lies between the sixth idle roller 66 and the fixing portion 70 vary so as to shorten their lengths by the same amount. Thus, the second guide member 28 does not move along the vertical direction, but only the slide block 34 is fed out rightwardly along the horizontal direction as viewed in FIG. 4.

Figure 5:
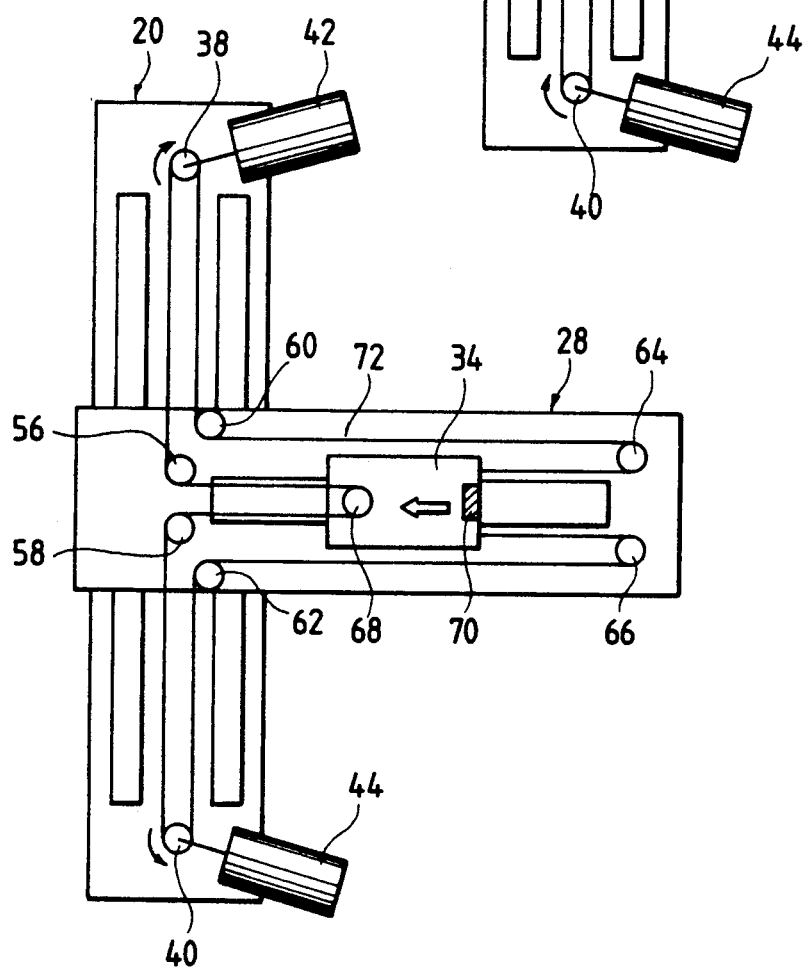
FIG. 5 is a front view showing a state in which only the slide block is moved to the left as viewed in this figure.

Subsequently, as shown in FIG. 5, the first drive roller 38 is rotated in the clockwise direction by the first servomotor 42 and in synchronism therewith, the second drive roller 40 is rotated by the same amount in the counter-clockwise direction by the second servomotor 44. As a result, that portion of the timing belt 72 which lies between the first idle roller 56 and the driven roller 68 and that portion of the timing belt 72 which lies between the second idle roller 58 and the driven roller 68 vary so as to shorten their lengths by the same amount, and that portion of the timing belt 72 which lies between the fifth idle roller 64 and the fixing portion 70 and that portion of the timing belt 72 which lies between the sixth idle roller 66 and the fixing portion 70 vary so as to lengthen their length by the same amount. Thus, the second guide member 28 does not move along the vertical direction, but only the slide block 34 is fed out leftwardly along the horizontal direction as viewed in FIG. 5.

Figure 6:
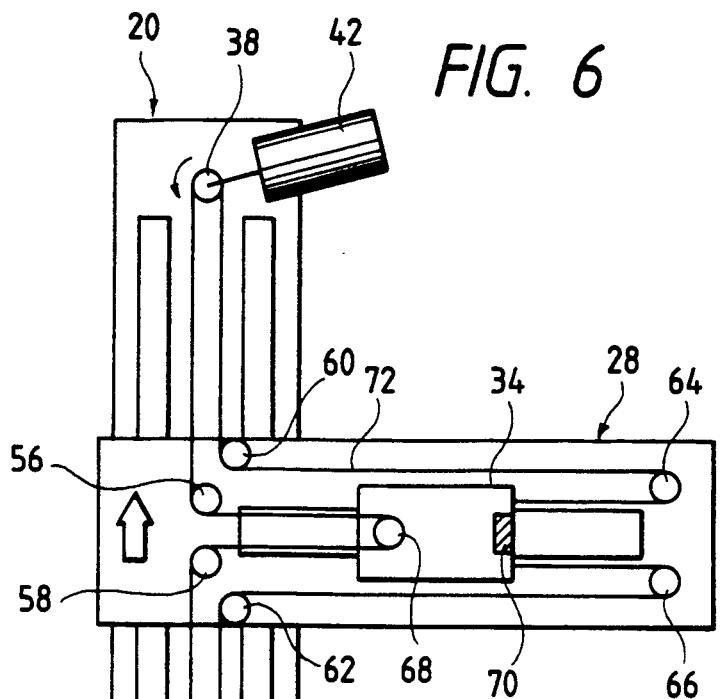
FIG. 6 is a front view showing a state in which only a second guide member is moved downwardly as viewed in this figure.

Also, as shown in FIG. 6, the first and second drive rollers 38 and 40 are rotated by the same amount in the counter-clockwise direction in synchronism with each other by the first and second servomotors 42 and 44, respectively. As a result, that portion of the timing belt 72 which lies between the second idle roller 58 and the second drive roller 40 and that portion of the timing belt 72 which lies between the fourth idle roller 62 and the second drive roller 40 vary so as to lengthen their lengths by the same amount, and that portion of the timing belt 72 which lies between the first idle roller 56 and the first drive roller 38 and that portion of the timing belt 72 which lies between the third idle roller 60 and the first drive roller 38 vary so as to shorten their lengths by the same amount. Thus, the slide block 34 does not move along the horizontal direction, but only the second guide member 28 is fed out upwardly as viewed in FIG. 6.

Figure 7:
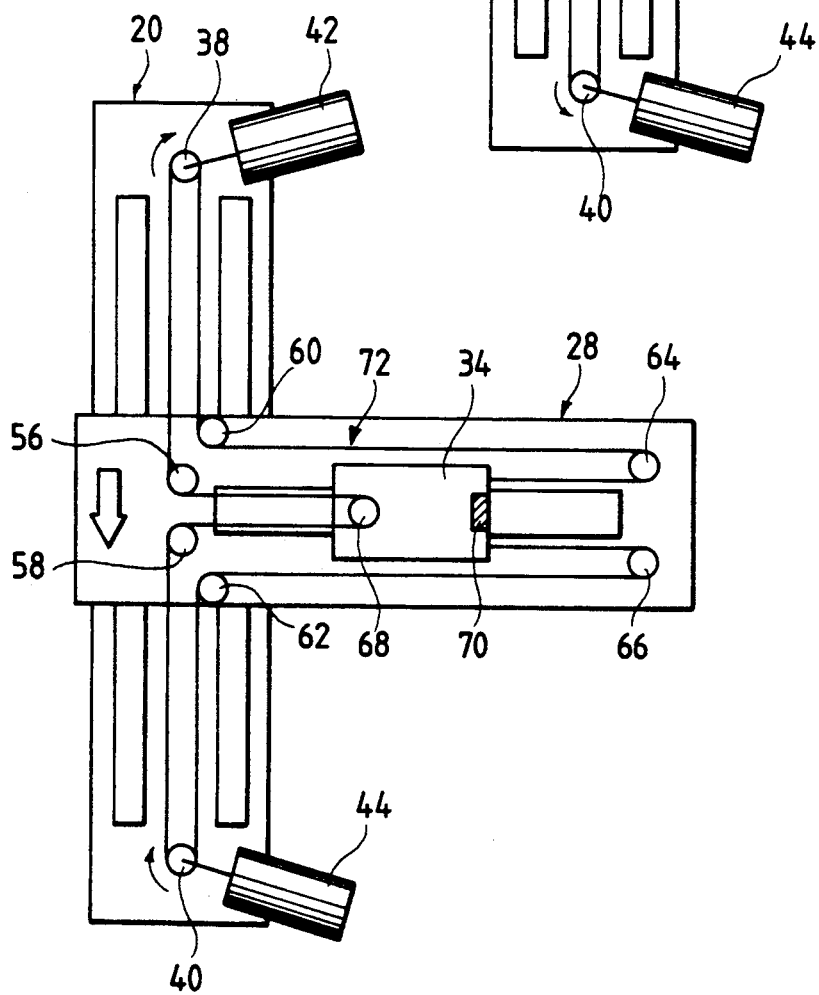
FIG. 7 is a front view showing a state in which only the second guide member is moved upwardly as viewed in this figure.

Then, as shown in FIG. 7, the first and second drive rollers 38 and 40 are rotated by the same amount in the clockwise direction in synchronism with each other by the first and second servomotors 42 and 44, respectively. As a result, that portion of the timing belt 72 which lies between the first idle roller 56 and the first drive roller 38 and that portion of the timing belt 72 which lies between the third idle roller 60 and the first drive roller 38 vary so as to shorten their lengths by the same amount, and that portion of the timing belt 72 which lies between the second idle roller 58 and the second drive roller 40 and that portion of the timing belt 72 which lies between the fourth idle roller 62 and the second drive roller 40 vary so as to lengthen their lengths by the same amount. Thus, the slide block 34 does not move in the horizontal direction, but only the second guide member 28 is fed out downwardly as viewed in FIG. 7.

As described above, in the orthogonal two-axis moving apparatus 14 of this embodiment, when the two servomotors 42 and 44 are rotated in the same direction in synchronism with each other, the second guide member 28 is moved along the vertical direction with the torques of the two servomotors 42 and 44 united together. Also, when the two servomotors 42 and 44 are rotated in different directions in synchronism with each other, the second guide member 28 itself remains stopped both in the vertical direction and the horizontal direction and on the surface thereof, only the side block 34 is moved along the horizontal direction with the torques of the two servomotors 42 and 44 united together.

Figure 8:
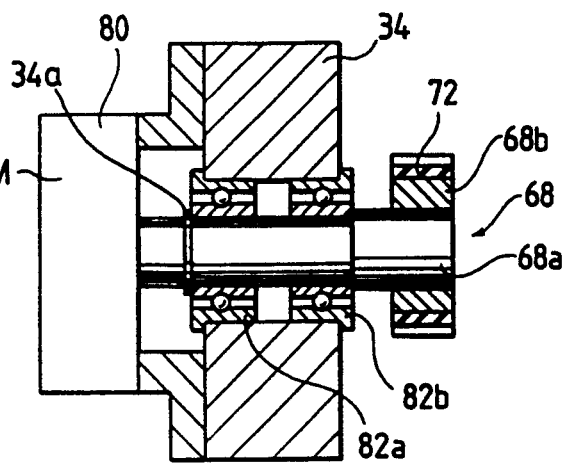
FIG. 8 is a cross-sectional view showing a state in which a brake mechanism is mounted on a driven roller.
Figure 9:
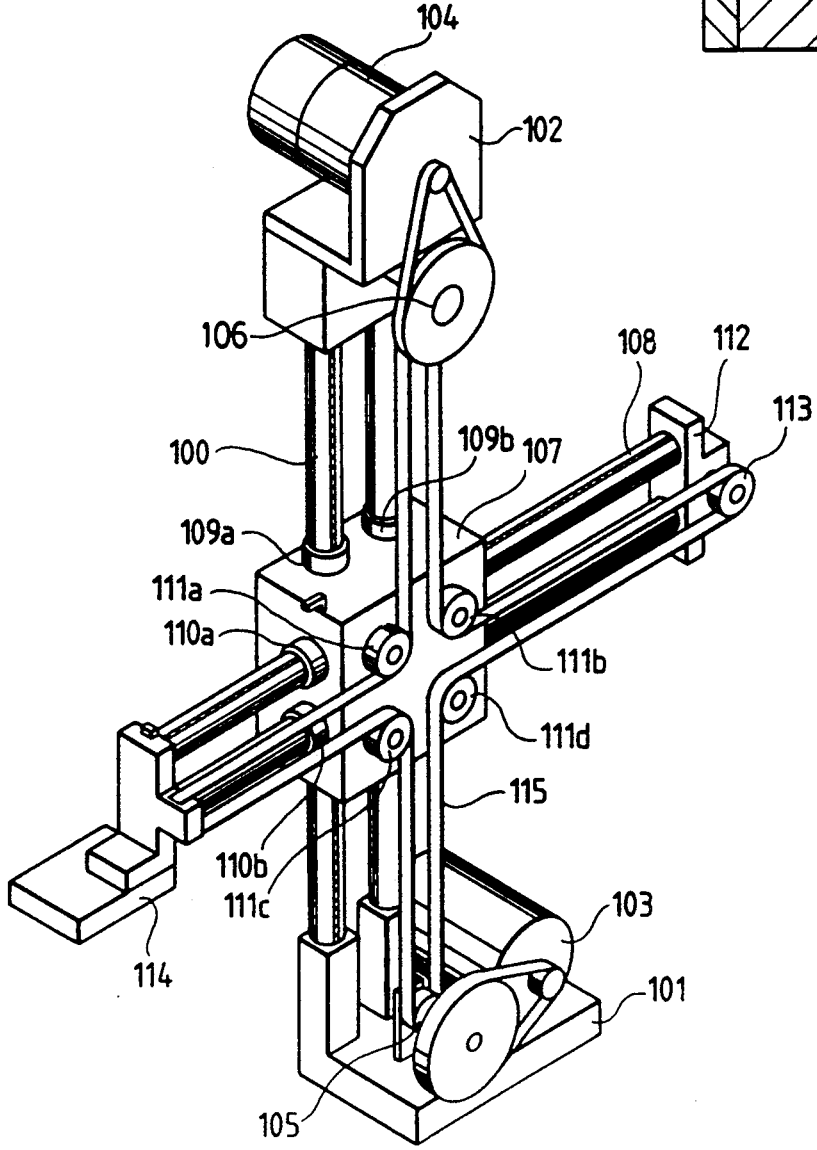
FIG. 9 is a perspective view showing the construction of an orthogonal two-axis moving apparatus according to the prior art.
Figure 10:
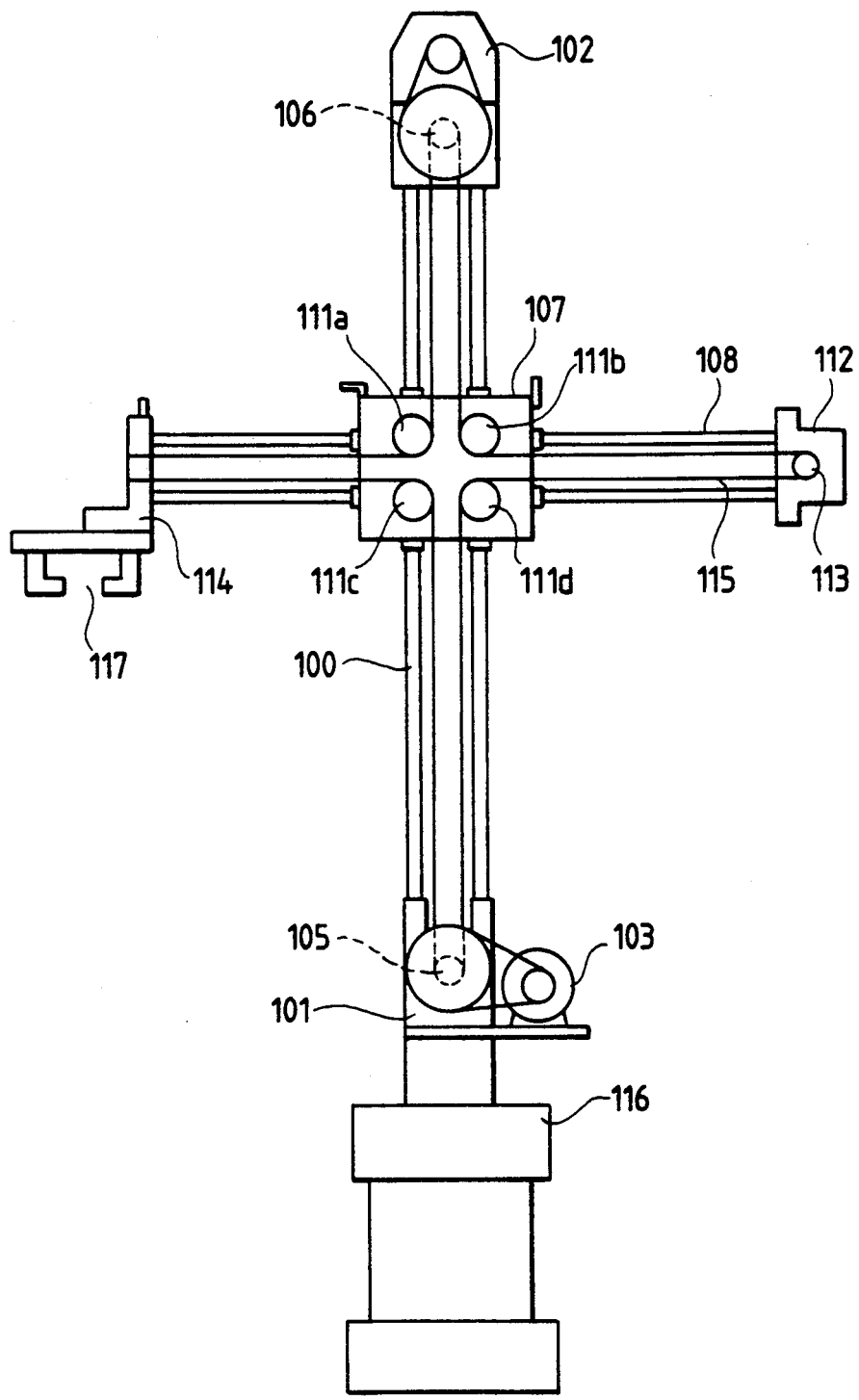
FIG. 10 is a front view showing a case where the prior-art orthogonal two-axis moving apparatus is applied to a cylindrical robot.

In this embodiment, the driven roller 68 has connected thereto a brake mechanism 80 for restraining the rotation thereof. The connected state of this brake mechanism 80 is shown in FIG. 8. That is, the driven roller 68 is comprised of a support shaft 68a extending through a through-hole 34a formed in the slide block 34 and rotatably supported by a pair of bearings 82a and 82b, and a roller body 68b coaxially fixed to the tip end of the support shaft 68a and over which the outer peripheral surface of the timing belt 72 is passed. The brake mechanism 80 is connected to the rear end of the support shaft 68a, i.e, the end portion thereof protruding to the back side of the slide block 34. This brake mechanism 80 is designed such that the brake thereof operates upon electrical deenergization of the brake mechanism to thereby render the driven roller 68 unrotatable and the brake is released upon electrical energization of the brake mechanism, and as shown in FIG. 3, it is connected to the control unit 54 so that its operative state may be controlled by the control unit 54.

Like this, only the driven roller 68 is locked through the brake mechanism 80, whereby the slide block 34 becomes movable along the horizontal direction by an extraneous force, while the second guide member 28 becomes immovable along the vertical direction. Thus, even if in the state as shown in FIG. 1 wherein the orthogonal two-axis moving apparatus 14 of the embodiment is applied to the cylindrical robot 10, the supply of electric power to the brake mechanism 80 is cut off, for example, due to power failure or the termination of the day's work, the second guide member 28 which is in the direction of movement relative to gravity will not fall and the safety against the stoppage of power supply will be ensured.

On the other hand, in a state in which the direct teaching mode has been set by the above-described switching switch 78, the power supply to the first and second servomotors 42 and 44 is dropped and the power supply to the rotary encoders 46 and 48 is not dropped and the power supply to the brake mechanism 80 is stopped to render the rotation of the driven roller 68 impossible, whereby the slide block 34 and accordingly the hand 16 mounted thereon becomes manually movable along the horizontal direction. In this manner, it becomes very simply executable to move the hand 16 along the horizontal direction by the direct teaching operation. When in the direct teaching operation, the hand 16 must be moved along the vertical direction, the electrical energization of the brake mechanism can of course be resumed.

The present invention is not restricted to the construction of the above-described embodiment, but can of course be variously modified within the scope of the invention as defined in the appended claims.

For example, in the above-described embodiment, the driven roller 68 has been described as having the brake mechanism 80 connected thereto, whereas the present invention is not restricted to such a construction, but each of the first and second servomotors 42 and 44 may be provided with a brake mechanism for locking the output shaft thereof, in place of or in addition to the brake mechanism 80. Each such brake mechanism is designed such that its braking force is released when electric power is supplied to it and that its braking force acts when the supply of electric power is cut off. In this manner, the first and second servomotors 42 and 44 have their respective output shafts locked by their respective brake mechanisms, whereby the second guide member 28 is prohibited from moving in the vertical direction and the movement of the slide block 28 in the horizontal direction is also prohibited. By thus mounting the brake mechanisms on the servomotors 42 and 44, the fall of the second guide member 28 when the power supply is stopped is prevented, and as in the case where the brake mechanism 80 is provided in the above-described embodiment, the safety during the stoppage of power supply such as power failure is ensured.

Also, in the above-described embodiment, the orthogonal two-axis moving apparatus 14 has been described as being used in the cylindrical robot 10, whereas the present invention is not restricted to such an application, but can be used also as a two-axis orthogonal robot with the first guide member 20 fixed and with the hand 16 supported on the slide block 34.

Also, in the above-described embodiment, the transmission of the drive force has been described as being effected through the toothed timing belt 72, whereas the present invention is not restricted to such a construction, but an untoothed timing belt may also be utilized, and the drive force may be transmitted by other means such as a chain or wire without any problem.

Also, in the above-described embodiment, the first guide member 20 has been described as being mounted upright, whereas the present invention is not restricted to such a construction, but the first guide member 20 may be disposed in a state in which it extends along the horizontal direction, and the second guide member 28 may be mounted so as to be vertically or horizontally orthogonal to the direction of extension of the first guide member 20. In the former case, the first guide member 20 is made movable along a direction horizontally orthogonal to the direction of extension thereof, whereby the hand 16 can be moved to any position in three-dimensional space, and in the latter case, the first guide member 20 is made movable along the vertical direction, whereby the hand 16 can be moved to any position in three-dimensional space.

Also, in the above-described embodiment, it has been described that only the inner side of the timing belt 72 is formed with teeth and each of the third and fourth idle rollers 60 and 62 and the driven roller 68 which are engaged by the smooth outer side of the timing belt is formed by a roller having a smooth outer peripheral surface, whereas the present invention is not restricted to such a construction, but the inner and outer sides of the timing belt 72 may be formed with teeth and each of the third and fourth idle rollers 60 and 62 and the driven roller 68 which are engaged by the toothed outer side of the timing belt may be formed by a toothed roller. By such a construction, the stoppage of the timing belt 72 resulting from the stoppage of the rotation of the driven roller 68 by the brake mechanism 80 can be reliably executed.

Also, in the above-described embodiment, a material of great coefficient of friction such as rubber may stick on the outer peripheral surface of the driven roller 68, whereby the stoppage of the timing belt 72 by the brake mechanism 80 can likewise be executed reliably.

Further, in the above-described embodiment, the hand 16 has been described as being fixed to the mounting bracket 36, whereas the present invention is not restricted to such a construction, but although not shown, provision may further be made of a drive motor for rotatively driving the hand 16 about its vertical axis, whereby when this orthogonal two-axis moving apparatus is applied to a robot, a part grasped by the hand 16 can be moved to any position, and at such any position, the part can be picked and placed in any rotated posture.

According to the present invention, the orthogonal two-axis moving apparatus constructed such that the hand does not protrude rearwardly with movement in a horizontal direction can be provided.

Also, according to the present invention, the orthogonal two-axis moving apparatus which enables articles to be disposed on the side opposite to the working area can be provided.

What is claimed is:

1. A moving apparatus hand, comprising:
   a first guide member extending off a base in a vertical direction and including a first guide rail;
   a first slide member sliding along said first guide rail;
   a second guide member mounted on said first slide member, fixed to said first slide member at a first end thereof so as to be arranged in a perpendicular direction to said first guide member to form a substantial "T" shape together with the first guide member, and including a second guide rail;
   a second slide member sliding on said second guide rail, on which a robot hand is mounted;
   means for moving the robot hand along said first and second guide members, said means comprising:
   first and second driving rollers;
   first and second driving motors coupled to said first and second driving rollers, respectively;

first and second idle rollers positioned in the first end of said second guide member, and arranged apart by a distance in a vertical direction so as to align with said first and second driving rollers in the vertical direction;

third and fourth idle rollers, one of which is positioned above said first idle roller in the vertical direction and the other of which is positioned below said second idle roller in the vertical direction on said second guide member;

fifth and sixth idle rollers positioned at a second end of said second guide member and disposed from each other by a predetermined distance;

a driven roller mounted on a first end of said second slide member vertically between said first and second idle rollers; and a belt member passing over each said roller;

detection means for detecting rotational positions of said first and second motors; and a controller for controlling rotational directions and electrical energization of said first and second motors.

2. An apparatus according to claim 1, wherein the belt member has an inner surface and an outer surface and is fixed at a first end to a second end of said second slide member, wherein said belt passes over said fifth idle roller engaging said inner surface therewith, passes over said third idle roller engaging said outer surface therewith, passes over said first driving roller engaging said inner surface therewith, passes over said first idle roller engaging said inner surface therewith, passes over said driven roller engaging said outer surface therewith, passes over said second idle roller engaging said inner surface therewith, passes over said second driving roller engaging said inner surface therewith, passes over said fourth idle roller engaging said outer surface therewith, passes over said sixth idle roller engaging said inner surface therewith, and is fixed at its second end to said second slide member.

3. An apparatus according to claim 1, further comprising rotation driving means for mounting said first guide member and rotating it around an axis to rotate the robot hand.

4. An apparatus according to claim 3, further comprising brake means coupled to said driven roller for controlling rotation of said driven roller in accordance with a signal from said controller.

5. An apparatus according to claim 4, further comprising:

teaching procedure memorizing means for memorizing a movement sequence locus of the robot hand;

input means for inputting the movement sequence locus and including keyboard input means by which the movement sequence locus are inputted to said memorizing means; and switch means for switching to input the movement sequence locus of the robot hand driven roller ny said input means, or to input the movement sequence locus directly to said memorizing means by manually moving the robot hand.

* * * * *

UNITED STATES PATENT AND TRADEMARK OFFICE
CERTIFICATE OF CORRECTION

PATENT NO. : 5,265,490
DATED : November 30, 1993
INVENTOR(S) : Azuma et al.

It is certified that error appears in the above-indentified patent and that said Letters Patent is hereby corrected as shown below:

COLUMN 1:

Line 33, "bushes 109a" should read --bushings 109a--.
Line 36, "bushes 110a" should read --bushings 110a--.

COLUMN 3:

Line 42, "a thing" should read --an item--.

COLUMN 10:

Line 52, "apparatus hand," should read --apparatus,--.

COLUMN 12:

Line 25, "locus are" should read --loci are--.
Line 28, "ny" should read --by--.

Signed and Sealed this

Twenty-seventh Day of September, 1994

Attest:

BRUCE LEHMAN

*Attesting Officer*     *Commissioner of Patents and Trademarks*